United States Patent [19]

Becker

[11] 4,132,145

[45] Jan. 2, 1979

[54] FREE SPINNING WASHER-NUT ASSEMBLY

[75] Inventor: Charles H. Becker, Braintree, Mass.

[73] Assignee: TRW Inc., Cleveland, Ohio

[21] Appl. No.: 786,170

[22] Filed: Apr. 11, 1977

[51] Int. Cl.$^2$ .................... F16B 37/00; F16B 39/24
[52] U.S. Cl. ........................................ 85/32 R; 151/7;
151/38
[58] Field of Search ............ 85/32 R, 50 R, 45, 1 JP;
151/38, 37; 10/155 R

[56] References Cited
U.S. PATENT DOCUMENTS

| | | | |
|---|---|---|---|
| 2,761,349 | 9/1956 | Heller | 85/32 R |
| 2,784,930 | 3/1957 | Wernecke | 85/32 R X |
| 2,851,079 | 9/1958 | Heller | 151/38 X |
| 2,943,661 | 7/1960 | Stern | 85/32 R X |
| 2,945,524 | 7/1960 | Becker | 151/38 |
| 3,164,055 | 1/1965 | Duffy | 151/38 X |
| 3,425,473 | 2/1969 | Knowlton | 151/38 |
| 3,622,167 | 11/1971 | Velthoven | 85/32 R X |
| 3,796,123 | 3/1974 | Duffy et al. | 85/32 R |

FOREIGN PATENT DOCUMENTS 1321103  6/1973  United Kingdom .................... 85/32 R Primary Examiner—Ramon S. Britts
Attorney, Agent, or Firm—James R. O'Connor; Martin J. O'Donnell; Thomas C. O'Konski

[57] ABSTRACT

A washer-nut assembly wherein a sheet metal nut is rotatably coupled within an annular plastic washer. The nut has an inner threaded barrel portion for engaging the threads of a cooperating bolt, an outer barrel portion shaped for engagement by a tightening tool and a frusto-conically shaped skirt portion extending outwardly from the outer barrel portion. The washer includes a central through-aperture and an inboard surface near one end of the washer that defines a seat for the skirt portion of the nut. The axial height of the washer is substantially greater than that of the nut so that the nut is recessed within the washer. The nut is coupled to the washer by skiving material from the inboard surface of the washer to form tongues that overhang the skirt portion of the nut. The tongues retain the nut within the washer yet permit free-spinning of the nut and washer relative to one another.

16 Claims, 7 Drawing Figures

FREE SPINNING WASHER-NUT ASSEMBLY

BACKGROUND OF THE INVENTION

1. Field of the Invention

This invention relates generally to coupled washer-nut assemblies and, more particularly, to such assemblies in which the washer and nut are freely rotatable relative to one another.

2. Description of the Prior Art

A wide variety of coupled washer-nut assemblies are known in the prior art. Such assemblies have several recognized advantages over separate nuts and washers. For example, they are typically more convenient to handle and apply to a cooperating bolt, and simpler to package and ship, than separate nuts and washers. They also reduce the loss of washers to be used with nuts in given applications and effectively insure that the proper size and shape of washer is consistently available for each application.

In many of the earlier coupled washer-nut assemblies, the washer and nut were separately fabricated but non-rotatably coupled. A characteristic non-rotatably coupled, or fixed, washer-nut assembly is disclosed in U.S. Pat. No. 2,761,349. Fixed assemblies of this type are undesirable for use in many applications because of the relatively high torque that must be applied to the nut to achieve a desired degree of tension on a cooperating bolt. Since both the nut and the washer rotate together even after the washer is initially tightened against a confronting surface of a workpiece, excess torque must be applied to the nut to overcome frictional forces between the washer and the confronting surface. This excess torque increases as the tightness of the nut on the bolt is increased. Also, during tightening, the edge of the washer oftens scores, gouges or otherwise damages the confronting surface. Additionally, when a sealing element is disposed adjacent the undersurface of the washer, the coincident rotation of the washer often causes the element to be torn, ruptured or deformed and thereby rendered less effective.

Because of the above problems, most later-designed washer-nut assemblies coupled the washer and the nut so that both components could rotate independently of one another. Examples of such rotatably coupled, or free-spinning, assemblies are shown in the following references: U.S. Pat. Nos. 2,851,079; 2,943,661; 3,569,491; 3,796,123; and in British Pat. No. 929,807.

One of the primary objectives of such free-spinning assemblies is the reduction of the torque which must be applied to the nut to realize a specified degree of tension on the bolt onto which the nut is turned. Many of the free-spinning washer nut assembly designs have served only to delay the point at which the washer commences to rotate with the nut and relative to the confronting surface, and thus have been only partly successful in achieving the above objective. Other prior assemblies have been more effective in reducing washer rotation during tightening, but have been susceptible to loosening on the bolt after tightening due to the vibration or flexure of the workpiece. Such assemblies have thus been found to be undesirable for use in applications in which vibration and flexure of the workpiece are to be expected.

Still other prior assemblies, in order to reduce the likelihood of washer rotation during tightening and to provide an increased resistance to loosening after tightening on a bolt, have required relatively complex washer and nut constructions and designs. As a result, these latter assemblies have been relatively difficult and expensive to produce.

OBJECTS OF THE INVENTION

It is, therefore, a primary object of this invention to provide an improved free-spinning washer-nut assembly.

Another object of the invention is to provide an improved washer-nut assembly which is effective in reducing the possibility of continued washer rotation after the washer is initially clamped against a confronting surface.

Another object of the invention is to provide an improved washer-nut assembly of the above type which provides resistance to loosening after tightening to a desired degree of tension on a bolt.

Still another object of the invention is to provide an improved washer-nut assembly of the above type which is relatively simple and inexpensive to fabricate.

SUMMARY OF THE INVENTION

A washer-nut assembly fabricated in accordance with this invention generally comprises a nut and washer coupled for independent rotation relative to one another. The nut, which is preferably of a unitary sheet metal construction, includes an inner, threaded barrel portion for engaging a cooperating bolt, an outer barrel portion shaped for engagement by a tool utilized to rotate the nut, and a flared skirt portion extending outwardly from the outer barrel portion. The washer comprises an annular body, preferably formed of a relatively hard plastic such as nylon, having an inboard surface defining a central aperture extending axially from an upper end surface to a lower end surface thereof. The axial height of the washer is preferably greater than the axial height of the nut. Also, the diameter of the aperture is greater than the diameter of the skirt portion of the nut except near the lower end surface of the washer where the inboard surface extends radially inwardly to define the annular, upwardly directed surface therein. The nut is disposed within the central aperture of the washer with the skirt portion of the nut supported on the upwardly directed surface therein.

The nut is coupled to the washer simply by skiving or paring material from the inboard of the washer so that it overhangs the skirt portion of the nut. The skiving is preferably done at four discrete locations spaced about the inboard surface and is controlled so that the nut remains connected to the washer but is free to spin relative to the washer.

The resulting assembly, even though relatively simple and inexpensive to produce as compared to prior assemblies of the same type, is highly effective in inhibiting continued washer rotation subsequent to initial clamping of the washer against a workpiece surface. The assembly thus exhibits a relatively low torque-to-tension relationship during tightening on a bolt and minimizes the potential for damage to the workpiece surface and to interposed sealing elements when used therewith. Additionally, the assembly can be adapted to provide increased resistance to loosening after the nut is tightened on a bolt and thus is admirably suited for use with workpieces subjected to constant vibration and flexure.

BRIEF DESCRIPTION OF THE DRAWING

The foregoing and other objects, features and advantages of the invention will be better understood from the following detailed description taken in conjunction with the accompanying drawing in which.

DETAILED DESCRIPTION OF PREFERRED EMBODIMENTS

Figure 1:
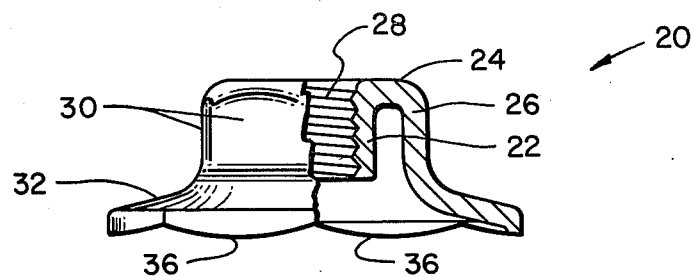
FIG. 1 is a side view, partly in section, of a nut utilized in a free-spinning washer-nut assembly embodying the invention.

Referring now to FIGS. 1-5 of the drawing, a free-spinning washer-nut assembly 10 according to the invention is shown generally comprising a nut 20 rotatably coupled to a washer 50.

The nut 20, which is preferably drawn as a unitary body from a single piece of sheet metal, is shown separately, and prior to assembly with the washer 50, in FIG. 1 of the drawing. The nut 20 includes an inner barrel portion 22 connected at its upper end through a web 24 to an outer, hexagonally shaped barrel portion 26. The outer nut barrel portion 26 circumscribes the inner nut barrel portion 22 in a spaced relationship thereto. The inboard surface of the inner nut barrel portion 22 includes a multi-convolution thread 28 of a standard type which is adapted for threaded engagement with a cooperating bolt. The hexagonal shape of the outer nut barrel portion 26 provides a plurality of wrenching faces 30 which are engageable by a tool utilized to tighten and loosen the nut 20 on a bolt.

A frusto-conically shaped skirt portion 32 extends radially from the lower end of the outer nut barrel portion 26. The underedge of skirt portion 32 may be flat, but is preferably scalloped as indicated in the Figures. The scalloped underedge may be formed during drawing of the nut 20 by downwardly turning circumferentially spaced edge sections of the skirt portion 32 to form a series of spaced, rounded projections or teeth 36. As will be more fully appreciated below, the teeth 36 advantageously help to prevent loosening of the nut 20 once the nut 20 is tightened onto a bolt against a confronting surface.

Figure 2:
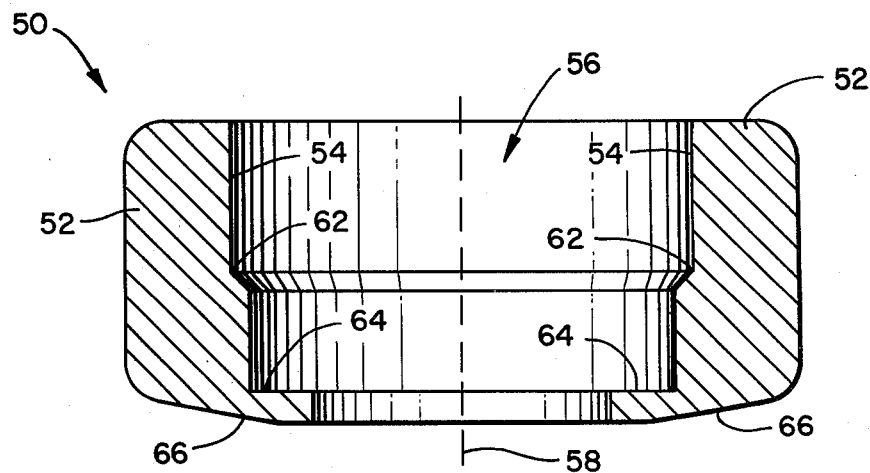
FIG. 2 is a side view, in section, of a washer utilized in the washer-nut assembly of the invention.

The washer 50 is shown separately, and prior to assembly with the nut 20, in FIG. 2 of the drawing. Washer 50 has a generally cylindrical shape and a relatively thick, annularly shaped side wall 52, the inboard surface 54 of which defines a central through-aperture 56. The diameter of the aperture 56 varies along the central axis 58 of the washer 50. More specifically, the aperture 56 has a maximum diameter greater than the outside diameter of the skirt portion 32 of the nut 20 at and below the upper end of the washer 50. At an axially intermediate position 62 within the washer 50, the inboard surface 54 tapers inwardly, preferably at an angle of about 45° to the axis 58, so that, below position 62, the diameter of the aperture 56 is reduced but is still somewhat greater than the diameter of the skirt portion 32 of the nut 20. Finally, near the lower end of the washer 50, the inboard surface 54 projects radially inwardly toward the axis 58 to reduce the diameter of the aperture 56 to less than the diameter of the skirt portion 32. As a result, a relatively flat, upwardly directed annular surface 64 is defined within the washer 50 which serves as a seat for the skirt portion 32 of the nut 20.

The washer 50 is preferably fabricated as a unitary body from a relatively hard, but deformable material such as a plastic (e.g., nylon). The upper and lower external corners of the side wall 52 are preferably rounded to eliminate sharp edges. The outside portion of the undersurface 66 of the washer 50 is also preferably tapered upwardly at a slight angle relative to the plane defined by the central portion of the undersurface 66 (e.g., at an angle of about 10° to that plane). It is the undersurface 66 of the washer 50 that, in use, engages a confronting surface; the taper in the undersurface 66 facilitates the establishment of flush contact with surfaces that are contoured.

Figure 3:
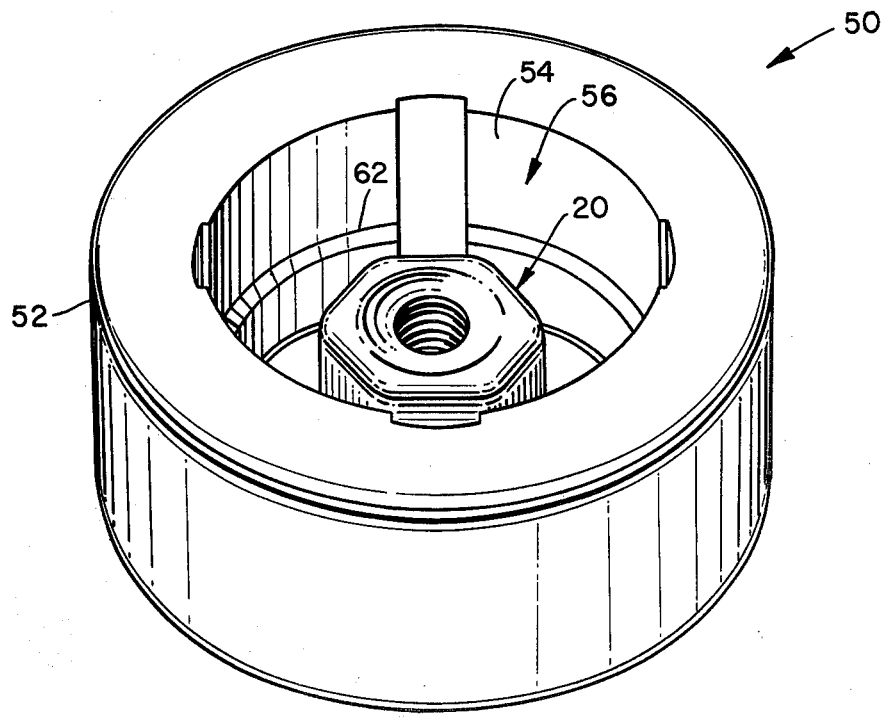
FIG. 3 is a perspective view of the washer-nut assembly of the invention after assembly of the nut and the washer.
Figure 4:
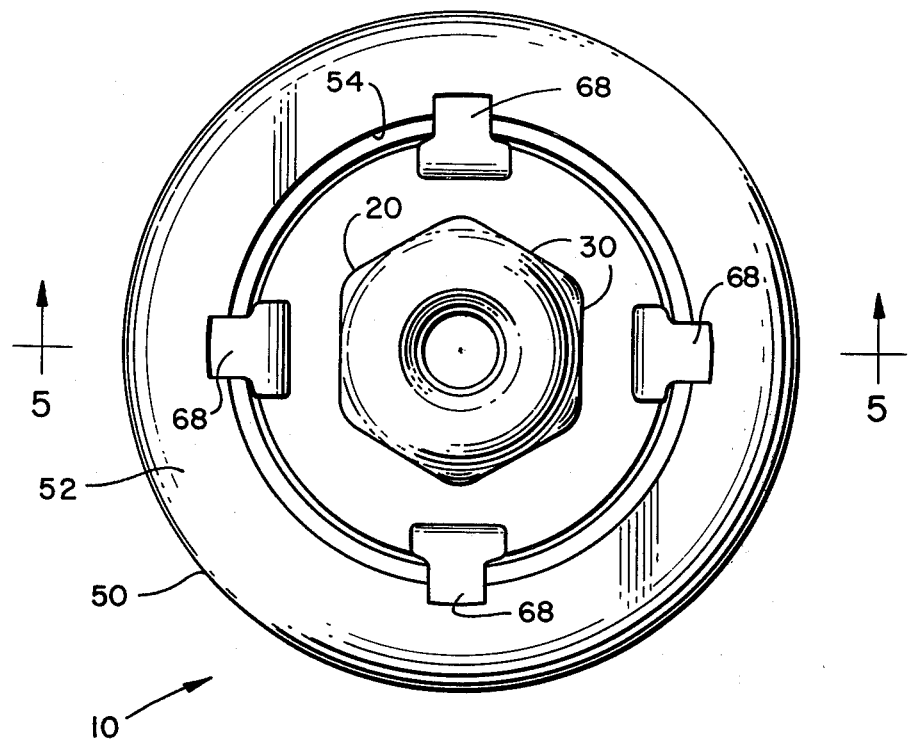
FIG. 4 is a top plan view of the washer-nut assembly of FIG. 3.
Figure 5:
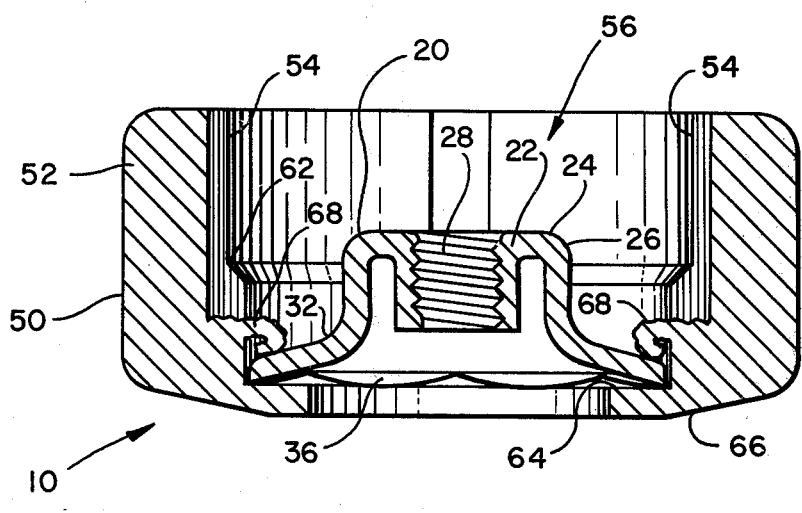
FIG. 5 is a side view, in section, of the washer-nut assembly of FIGS. 3 and 4.

In effecting assembly of the nut 20 and washer 50, the nut 20 is disposed within the aperture 56 of the washer 50 with the skirt portion 32 of the nut 20 resting on the surface 64 of the washer 50, as illustrated in FIGS. 3-5 of the drawing. To secure the nut 20 to the washer 50, material is pared or skived from the inboard surface 54 of the side wall 52 of the washer 50 to form integral tongues 68 that overhang the upper edge of the skirt portion 32 of the nut 20.

As best seen in FIG. 4, the skiving is illustratively done at four discrete locations equally spaced about the inboard surface 54 to produce four such tongues 68. Actually, any number of discrete skived tongues or a continuous skived rib that extends completely around the inboard surface 54 may be used. The axial depth of each skive is selected so that, after skiving, the nut 20 is still free to rotate relative to the washer 50. The resulting connection is thus relatively loose to permit free spinning of the nut 20 and washer 50 relative to one another, yet is effective in maintaining the nut 20 and washer 50 in assembly under normal conditions of usage such as during packing, shipping and repeated applications to and removal from a cooperating bolt.

The skiving operation is preferably done as a single step in the formation of the assembly 10 using a skiving tool especially designed for this purpose. The tool may be provided with four separate, orthogonally oriented blades or a crossed pair of double ended, elongated blades capable of skiving the four tongues 68 simultaneously. The blades of the tool may be heated to facilitate the skiving operation. The tool may be designed with an adjustable stopping mechanism so that the optimum axial skiving depth is provided in each assembly 10. The skiving tool may be adapted for manual operation, but is preferably automatically operated to facilitate mass production of the assemblies 10.

Figure 6:
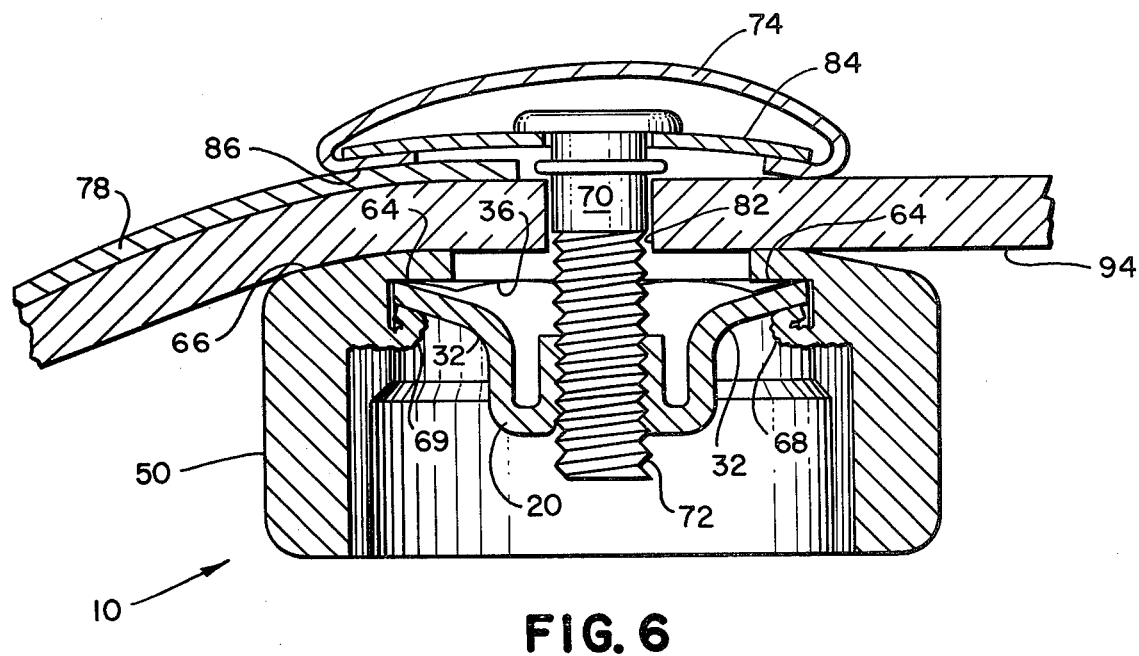
FIG. 6 is a side view, in section, showing the washer-nut assembly of FIGS. 3, 4 and 5 applied to a cooperating bolt used to secure a decorative molding to the roof panel of an automobile.

FIG. 6 shows the washer-nut assembly 10 applied to the shank 72 of threaded bolt 70. Although the assembly 10 may be used with cooperating bolts adapted for any of a variety of different joining, clamping and related applications, the bolt 70 shown in FIG. 6 is illustratively of the type used in securing a decorative molding 74 to a body panel of an automobile. The molding 74 may, for example, be a crown molding used to protect the edge of a vinyl covering 78 that is adhesively secured over a portion of a roof panel 76 in what is commonly known in the automotive industry as a "Landau" roof construction.

In the specific illustration of FIG. 6, the shank 72 of the bolt 70 passes through an opening 82 in the roof panel 76 which is located a short distance beyond the edge of the vinyl covering 78. A head plate 84 on the bolt 70 is adapted to fit within the molding 74 and to engage against inwardly-turned edges 86 and 88 thereof. The edge 86 of the molding 74 overwhich is located a short distance beyond the edge of the vinyl covering 78. A head plate 84 on the bolt 70 is adapted to fit within the molding 74 and to engage against inwardly-turned edges 86 and 88 thereof. The edge 86 of the molding 74 overlaps the edge of the vinyl covering 78, while the edge 88 contacts the outside surface 92 of the roof panel 76. The molding 74 is secured to the roof panel 76 by tightening the washer-nut assembly 10 onto the shank 72 and against the confronting inside surface 94 of the panel 76. Typically, a plurality of washer-nut assemblies 10 and cooperating bolts 70 are used at spaced positions along the molding 74.

Those desiring further details of the molding fastener bolts like the bolt 70 may refer to U.S. Pat. Nos. 2,709,286 and 3,151,716.

As noted previously, the washer-nut assembly 10 possesses a number of desirable features which come into play as it is tightened onto a cooperating bolt. These features will now be described with specific reference to the illustrative application depicted in FIG. 6. It should be clear, however, that the description applies generally to situations in which the assembly 10 is tightened onto a cooperating bolt against a confronting surface.

When the nut 20 is first turned onto the bolt 70, both the nut 20 and washer 50 may rotate together relative to the bolt 70 and to the inside surface 94 of the panel 76. However, as the nut 20 is further turned, the head plate 84 of the bolt 70 and the molding 74 are drawn against the outside surface 92 of the panel 76 and the skirt portion 32 of the nut 20 exerts a force against the annular surface 64 of the washer 50 thereby pressing the undersurface 66 of the washer 50 against the surface 94. Eventually, a point is reached at which the frictional resistance to rotation of the washer 50 relative to the surface 94 exceeds that of the nut 20 relative to the washer 50. The washer 50 thereupon ceases further corresponding rotation with respect to the nut 20 and the surface 94. Independent rotation of the nut 20 may thus be continued until the specified degree of torque has been applied thereto, as dictated by the tightness of the connection desired, the grade of the bolt 70 and other variable factors.

Since only the nut 20 rotates after the washer 50 is initially clamped against the surface 94, the amount of torque which must be applied to the nut 20 to achieve the desired tension on the bolt 70 is substantially reduced. This is because the amount of torque applied during the tightening need be sufficient only to overcome frictional resistance between the nut 20 and the washer 50 and not frictional resistance between the washer 50 and the confronting surface 94. Thus, the free-spinning assembly 10, eliminates excess torque which would otherwise result from coincidnet rotation of the washer 50 against the surface 94.

Additionally, since the washer 50 does not rotate relative to the surface 94, the surface 94 is not scored, gouged or otherwise damaged by the washer 50 during tightening of the nut 20. The likelihood of damage to the washer 50 itself is also reduced. Furthermore, the washer 50 serves as a protective barrier between the surface 94 and the leading end of a tool utilized to tighten the nut 20. The washer 50 thus inhibits undesirable scoring or marring of the surface 94 by the tool.

After the washer 50 is initially clamped against the surface 94, continued tightening of the nut 20 causes the skirt portion 32 thereof to flatten against the surface 64 of the washer 50. The skirt portion 32, however, has considerable resiliency and strongly tends to return to its original, unflattened shape. As a result, a reverse axial tension is exerted on the nut 20 that causes the interengaged threads of the nut 20 and bolt 70 to lock in a well known manner. During the final stages of tightening the nut 20, the teeth 36 thereon also actually bite into the surface 64 of the washer 50. This allows the nut 20 to grip the washer 50 and provides further resistance to loosening of the connection.

The washer-nut assembly 10 possesses other features that are particularly desirable in the illustrative application of FIG. 6. Since the assembly 10 is positioned on the inside of the roof panel 76, considerations of the safety of the driver and passengers in the vehicle become relevant. In this respect, it is noted that the exposed corners of the washer 50 are preferably rounded and the outside diameter of the washer 50 is preferably relatively large (e.g., greater than one inch) so that if the washer 50 were to be struck by an individual in the vehicle during an accident or otherwise, the likelihood of serious damage to the individual is minimized. Also in this respect, the axial height of the washer 50 is preferably large enough that, after the assembly 10 is fully tightened onto the bolt 70, neither the nut 20 nor the shank 72 of the bolt 70 protrude therefrom.

The leakage of moisture under the crown molding 74 through the opening 82 and into the interior of the vehicle has also been a problem with many conventional molding fastener arrangements. This problem is partly due to the fact that most roof panels, like the panel 76 shown in FIG. 6, are contoured to at least some extent. With conventional nut fasteners having flat or planar undersurfaces, it has been difficult to establish flush contact with the inside surface 94 of the panel in the vicinity of the opening 82. Moisture can thus leak through the gaps and voids between the surface and the nut fastener and cause damage to the interior of the vehicle.

As can be appreciated from FIG. 6, the tapered undersurface 66 of the washer 50 in the assembly 10 facilitates the establishment of flush contact with the surface 94 in the vicinity of the opening 82 and thus helps prevent leakage through the opening 82 into the vehicle.

Figure 7:
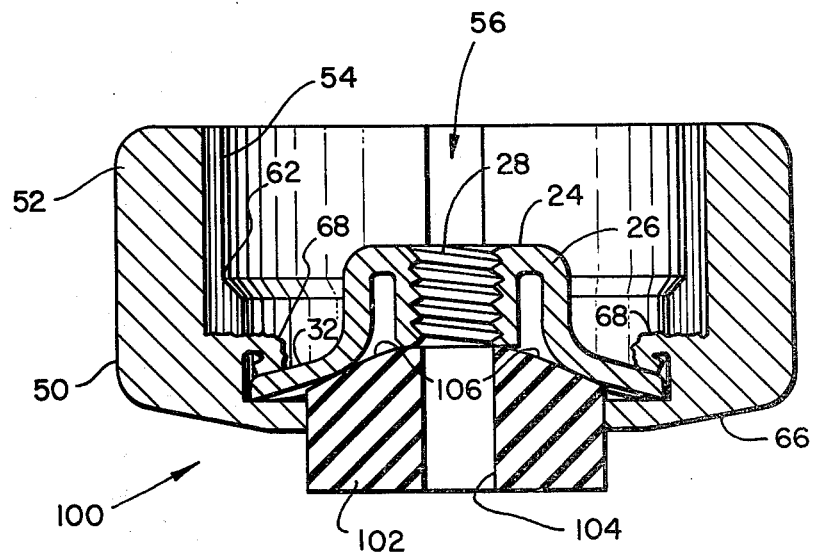
FIG. 7 is a side view, in section, of a modified free-spinning washer-nut assembly embodying the invention which is provided with a yieldable sealing element having a bolt receiving opening therethrough.

FIG. 7 shows a modified washer-nut assembly 100 embodying the invention which is adapted to provide an even more effective seal against the leakage of moisture. The assembly 100 is identical to the assembly 10 previously described with the exception of a yieldable sealing element 102 that protrudes from the aperture 56 of the washer 50 at the lower end of tthe assembly 10. The sealing element 102, which includes a bolt receiving opening 104 therethrough, is preferably added to the assembly 100 after the nut 20 and washer 50 are assembled together. The element 102 may be press fit into the aperture 56 or directly bonded to the undersurface of the nut 20 to prevent it from becoming separated during packaging, handling and the like of the assembly 100. In the latter case, the upper surface 106 of the element 102 may be contoured, as indicated in FIG. 7, to increase the contact area between it and the undersurface of the nut 20.

The sealing element 102 is also preferably formed of a mastic sealing material that deforms and flows as the washer 50 is pressed against a confronting surface during initial tightening of the assemby 100 on a cooperating bolt. The sealing element 102 tends to fill all minute voids and gaps that exist among the bolt, confronting surface, nut 20 and washer 50 and thereby prevents the leakage of moisture therethrough.

It should be understood that the above described washer-nut assemblies are intended only as specific, illustrative examples of the invention and that numerous modifications may be made thereto by those skilled in the art without departing from the scope of the invention as defined by the appended claims.

What I claim as new and desire to secure by Letters Patent is:

1. A free-spinning washer-nut assembly comprising:
   A. A nut including
      i. an inner, threaded barrel portion;
      ii. an outer barrel portion circumscribing said inner barrel portion and having one end joined to said inner barrel portion through a connecting web; and
      iii. a skirt portion joined to the end opposite said one end of said outer barrel portion and extending outwardly therefrom; and
   B. a washer comprising an annular body including
      i. an upper and a lower end surface;
      ii. an inboard surface defining a central aperture extending axially through said washer from said upper end surface to said lower end surface;
      iii. the inboard surface defining the aperture with a diameter greater than that of the skirt portion of said nut at and below the upper end surface of said washer;
      iv. the inboard surface extending radially inwardly near the lower end surface of said washer to define the aperture with a diameter less than that of the skirt porton of said nut and thereby defining a surface within said washer providing a seat for the skirt portion of said nut;
      v. means projecting into the central aperture from the inboard surface of said washer and overhanging the skirt portion of said nut so as to maintain said nut and said washer connected, but independently rotatable relative to one another; and
      vi. said means being spaced from the upper end surface of said washer a distance appreciably greater than the thickness of said skirt.

2. An assembly as recited in claim 1 in which said washer is formed as a unitary body from a relatively hard plastic material.

3. An assembly as recited in claim 2 in which said washer is formed from nylon.

4. An assembly as recited in claim 1 in which said projecting means comprise a plurality of discrete tongues of material skived from the inboard surface of said washer to overhang the skirt portion of said nut.

5. An assembly as recited in claim 1 in which the inboard surface of said washer defines the aperture with a first diameter greater than that of the skirt portion of said nut at and below the upper end surface of said washer, in which the inboard surface tapers inwardly at an angle to the axis of said washer at an axially intermediate position within said washer to define the aperture with a second diameter less than the first diameter but greater than the diameter of the skirt portion of said nut and in which the inboard surface extends radially inwardly below the axially intermediate position and near the lower end surface of said washer to define said surface providing the seat for the skirt portion of said nut.

6. An assembly as recited in claim 1 in which the outside portion of the lower end surface of said washer is tapered toward the upper end surface thereof so as to facilitate the establishment of flush contact between the lower end surface of said washer and a confronting surface that is contoured.

7. An assembly as recited in claim 1 in which the outside diameter of said washer is greater than one inch.

8. An assembly as recited in claim 1 in which the axial height of said washer is substantially greater than the axial height of said nut so that said nut is recessed below the upper end surface of said washer.

9. An assembly as recited in claim 1 in which said nut is formed as a unitary body from sheet metal.

10. An assembly as recited in claim 1 in which the outer barrel portion of said nut is externally shaped for engagement by a tool for rotating said nut.

11. An assembly as recited in claim 1 in which the skirt portion of said nut is of a frusto-conical shape that flattens against the upwardly directed surface of said washer when said nut is tightened onto a cooperating threaded bolt against a confronting surface, the skirt portion thereby exerting a reverse axial tension on said nut to lock the interengaged threads of said nut and the cooperating bolt.

12. An assembly as recited in claim 1 in which the underedge of the skirt portion of said nut includes a plurality of spaced teeth that bite into the surface of said washer defining the seat for the nut skirt when said nut is tightened onto a cooperating bolt against a confronting surface and thereby provide resistance to loosening of said nut on the bolt.

13. An assembly as recited in claim 1 further including
   C. a yieldable sealing element defining a bolt receiving opening aligned with the inner barrel portion of said nut and protruding from the central aperture at the lower end surface of said washer.

14. An assembly as recited in claim 1 in which said sealing element is formed of a mastic sealing material.

15. An assembly as recited in claim 1 in which said surface of said washer which provides a seat for the skirt portion of the nut extends upwardly relative to said lower end surface of said washer.

16. A free-spinning washer-nut assembly comprising:
   A. a nut including
      i. a threaded body portion; and
      ii. a skirt portion joined to said body portion adjacent one end thereof and projecting radially outwardly therefrom; and
      iii. a skirt portion joined to the end opposite said one end of said outer barrel portion and extending outwardly therefrom; and
   B. a washer comprising an annular body including
      i. an upper and lower end surface;

ii. an inboard surface defining a central aperture extending axially through said washer from said upper end surface to said lower end surface;
iii. the inboard surface defining the aperture with a diameter greater than that of the skirt portion of said nut at and below the upper end surface of said washer;
iv. the inboard surface extending radially inwardly near the lower end surface of said washer to define the aperture with a diameter less than that of the skirt portion of said nut and thereby defining a surface within said washer providing a seat for the skirt portion of said nut;
v. means projecting into the central aperture from the inboard surface of said washer and overhanging the skirt portion of said nut so as to maintain said nut and said washer connected, but independently rotatable relative to one another; and
vi. said means being spaced from the upper end surface of said washer a distance appreciably greater than the thickness of said skirt.

* * * * *